United States Patent Office.

HENRY D. BIRD, OF PETERSBURG, VIRGINIA.

Letters Patent No. 64,189, dated April 30, 1867.

IMPROVED COMPOUND FOR CLEANSING THE HUMAN BODY FROM OFFENSIVE ODORS.

*The Schedule referred to in these Letters Patent and making part of the same.*

TO ALL WHOM IT MAY CONCERN:

Be it known that I, HENRY D. BIRD, of Petersburg, in the county of Dinwiddie, and State of Virginia, have invented a new and improved Chemical Compound for the Purpose of Cleansing the Surface of the Human Body from Offensive Odors; and I do hereby declare the following to be a full, clear, and exact description thereof.

My invention consists in the admixture of certain chemical substances, named in my recipe, and in the proportions given therein, whereby a new and effective deodorizer, for cleansing the surface of the human body, is produced.

The following is the recipe for making my improved "deodorizer," viz: Chloride of lime, 75 parts; chloride of ammonium, 20 parts; bichromate of potash, 5 parts = 100 parts. The above-named chemicals to be mixed in saturated solutions, and such perfumes added as the taste or fancy may desire.

I am aware that the above-named chemicals have been used separately as disinfectants, but the combination named, and in the proportions given, is the result of many experiments, and is of great value in counteracting, in the case of many diseases, the odor from the human body consequent thereto, and is also effective in cleansing the surface of the human body from any and all offensive odors.

Having thus fully described by the within recipe the manner of making my improved deodorizer, what I claim, and desire to secure by Letters Patent, is—

A compound for cleansing the surface of the human body, substantially as herein set forth.

The foregoing specification of my improved compound for cleansing the surface of the human body from offensive odors signed by me this fifth day of October, A. D. 1866.

HENRY D. BIRD.

Witnesses:
H. H. YOUNG,
F. S. CISSEL.